United States Patent [19]

Hooke

[11] 4,322,597

[45] Mar. 30, 1982

[54] METHOD AND APPARATUS FOR INTERCONNECTING ELECTROCHEMICAL CELLS FOR A BATTERY

[75] Inventor: John W. Hooke, Gainesville, Fla.

[73] Assignee: General Electric Company, Gainesville, Fla.

[21] Appl. No.: 164,568

[22] Filed: Jun. 30, 1980

[51] Int. Cl.³ .............................................. B23K 11/10
[52] U.S. Cl. ................................ 219/91.1; 219/78.16; 219/91.23; 219/106; 219/158; 228/58; 228/901; 429/160; 429/161
[58] Field of Search .................. 219/56.1, 56.22, 78.16, 219/86.24, 91.2, 91.23, 106, 79, 153, 80, 158, 160; 228/49 R, 58, 901, 173 E; 429/160, 161

[56] References Cited

U.S. PATENT DOCUMENTS

| | | | |
|---|---|---|---|
| 1,215,964 | 2/1917 | Murray | 219/158 X |
| 1,408,140 | 2/1922 | Schulte | 429/160 X |
| 3,525,151 | 8/1970 | Pellerin | 219/79 X |
| 3,574,934 | 4/1971 | De Rose | 228/173 E X |
| 3,668,761 | 6/1972 | Buttke et al. | 228/58 X |
| 3,810,790 | 5/1974 | Denis | 219/56.22 X |
| 4,127,759 | 11/1978 | Pile et al. | 219/160 X |

Primary Examiner—J. V. Truhe
Assistant Examiner—Keith E. George
Attorney, Agent, or Firm—Morgan, Finnegan, Pine, Foley & Lee

[57] ABSTRACT

Apparatus and method for mechanically and electrically interconnecting the individual electrochemical cells for a battery. A cell-holding fixture maintains the cells in fixed relationship and includes a conductive electrode disposed adjacent each terminal to be interconnected. Projecting cell terminals are partially bent about the conductive electrodes by pivotal arms and the fixture is then moved toward the ends of the arms Zto complete the bending of the terminals so that they lie in a common plane. A conductive link is placed over the bent terminals and a pair of welding electrodes, one in contact with the conductive link and the other in electrical contact with the conductive electrode of the fixture, passes a welding current through the link and terminal to effect the weld. The fixture is passed over an adhesive strip applicator for taping together the bottom surfaces of the cells prior to their removal from the fixture.

14 Claims, 12 Drawing Figures

METHOD AND APPARATUS FOR INTERCONNECTING ELECTROCHEMICAL CELLS FOR A BATTERY

BACKGROUND OF THE INVENTION

This invention relates to the manufacture of batteries comprised of a plurality of interconnected individual electrochemical calls.

Rechargeable electrochemical batteries include two or more electrochemically independent cells that are connected together in series to provide a battery output voltage that is a multiple of the voltage of each individual cell. In the familiar automobile battery, these cells are contained in an acid-resistant casing and all connections between cells are made internally of this casing. In a battery of this type, each cell does not exist independently as a unit but, rather, is found only as one of a series of components embodied in the battery.

In many other types of battery applications, however, the battery is comprised of a plurality of interconnected individual cells, each of which is by itself a finished product. In batteries of this type, the individual cells, which can take the form of the familiar D-size flashlight cells, are placed side by side or end to end, and interconnected by one means or another in order to raise the battery potential. There are several advantages to this type of battery, not the least of which is the fact that a defective individual cell in the battery can be replaced without destroying the entire battery. Another advantage is the versatility which is possible, since batteries of any electrical capacity and voltage can be constructed simply by altering the number and type of individual cells used in the battery. In the case of sealed lead acid cells, each has a nominal circuit voltage of between about 2.1 volts and 2.2 volts. Because of standardization in the industry, it is generally found that lead acid battery cells are interconnected in threes so as to obtain battery voltages in multiples of six volts. A six-volt battery is thus arrived at by interconnecting three cells (3×2 volts=6 volts), a twelve-volt battery by interconnecting six cells (6×2—12 volts).

It is highly desirable, and often necessary, that the interconnections between cells be relatively permanent and not subject to vibration, oxidation and other effects which impair the integrity of the conductive connection between adjacent cells or which appreciably alter the inter-cell electrical resistance. For that reason, small-scale batteries usually have employed permanently welded connections between cells. A welded connection offers permanence and reliability; yet, it can also be separated when necessary by stripping the welded conductor from the terminal.

The cells themselves usually comprise a cylindrical casing having projecting from the top surface thereof a pair of spade terminals, these terminals being relatively thin, flat conductors which are adapted to receive spade connectors. For welding purposes, however, it is not convenient to have the terminals projecting upwardly from the cell, as this makes it difficult to effect a weld between the terminal and the interconnecting conductor. Moreover, leaving the terminals in the upstanding position would add materially to the dimensions of the battery and tend to establish loops in the connecting links. It is accordingly the usual practice to bend over the projecting terminals so that they lie generally in a common plane, place a conductive link over the exposed surfaces of the bent terminals, and then weld the conductive link to the terminals.

The terminal bending operation is generally carried out on the cell by an operator who simply folds over the terminals by hand. Similarly, the placement of the interconnecting link over the terminals and the welding step is also done by hand, it being understood that the operator places the cell or cells into the appropriate position of a welding apparatus to effect the latter step. The cells sometimes are held together with an adhesive strip which is placed on the cells being interconnected, again this strip being carried out by hand.

The extensive hand work required to interconnect cells in the manner just described results in the expenditure of excessive operative time, and subjects the cells to variations in quality inherent in any hand operation. For example, it is difficult for a human operator to bend the terminal tabs in a consistent manner from one cell to the next. The terminals tend to bend at different distances above the top surface of the cell and thus do not always lie in a common plane. Equal difficulty is encountered in attempting to bend the terminals over consistently along the same bend line. Adding to these variations is the frequent misalignment of the link relative to the terminal, a condition which can contribute to improper welding and insufficient weld strength.

SUMMARY OF THE INVENTION

The present invention addresses the problem of interconnecting the terminals of individual electrochemical cells used in an electrochemical cell battery. It enables the production rate of the cell-interconnecting step to be stepped up considerably while facilitating neater and more reliable interconnections between cells. In addition, it promotes the automatic affixation of adhesive strips to the cells for holding them securely together for further processing and use.

In brief, the present invention comprises a method and apparatus in which a cell-holding fixture is provided for receiving and holding plural cells in fixed relation, the fixture having a conductive electrode disposed adjacent each terminal to be interconnected. While the cells are in the fixture, the cell terminals are bent about the conductive electrode so that the surfaces of the terminals lie generally in a common plane. A conductive link is placed over the exposed surfaces of the bent terminals so as to be in physical contact therewith, the link and fixture being thereafter contacted with respective welding electrodes to establish a circuit for the passage of welding current through the joint between the link and terminal and thereby to effect a weld connection at the joint.

In preferred embodiments, the bending means comprises a pivotal arm for each terminal to be bent, the arm being pivotal between a first position out of contact with the terminal and a second position, the arm engaging the terminal and bending it over at least partially as it moves from the first position to the second position. Moreover, the arm provides an anvil surface while in the second position against which the cell may be moved to complete the bending step. The fixture is adapted for insertion into a jig or track associated with the welding apparatus so that the welding electrodes may be brought into accurate contact with the link and the fixture.

DESCRIPTION OF THE DRAWINGS

For a complete understanding of the invention, together with the further objects and advantages thereof, reference should be made to the following detailed description and to the drawings, in which.

DETAILED DESCRIPTION OF THE PREFERRED EMBODIMENT

Figure 1A:
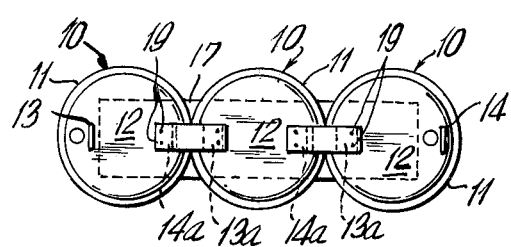
FIGS. 1A and 1B are plan and elevation views, respectively, of three cells interconnected by welded conductive links in accordance with the invention.
Figure 1B:
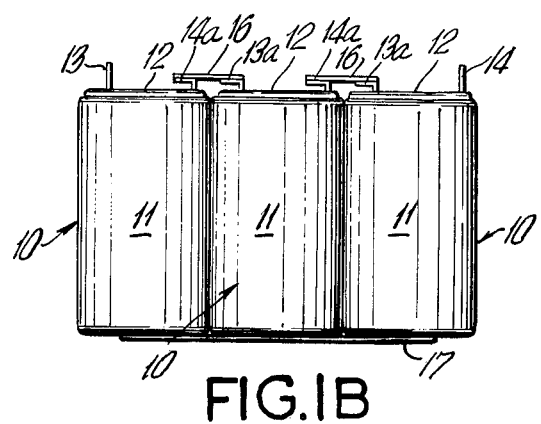

In FIGS. 1A and 1B, there is shown a three-cell battery configuration assembled in accordance with the invention. Each cell 10 is a typical commercial cell comprised of a cylindrical casing 11, a top cap 12, a positive terminal 13 and a negative terminal 14, both terminals normally projecting from the top surface of the cap. The terminals between the two outer terminals of the assembly have been bent over, so that the upper portions thereof lie horizontally in a common plane. These terminals, designated as 13a, 14a, are interconnected by conductive links 16. The links 16 join adjacent positive and negative terminals so that the three cells are joined electrically in series.

At the bottom of the three-cell assembly is a strip 17 backed on one side with an adhesive which is applied to the undersurfaces of the cells 10. This strip precludes relative movement of the cells at the lower extremities, the cells being firmly bound together at their tops by the conductive links 16, which are mechanically and electrically affixed to adjacent terminals by welds 19. As will become more apparent shortly, the three cells are assembled together by placing them in a fixture which is compatible with both the bending apparatus and the welding apparatus so that the normally upstanding flat terminals of the cell can be folded into a common plane and an interconnecting link applied, the link and terminals being welded together. While the cells are in the fixture, the adhesive strip is applied so that when the cell assembly is removed from the fixture, it comprises a unitary three-cell battery ready for shipping, further packaging or integration into a larger, multi-cell battery.

Figure 2:
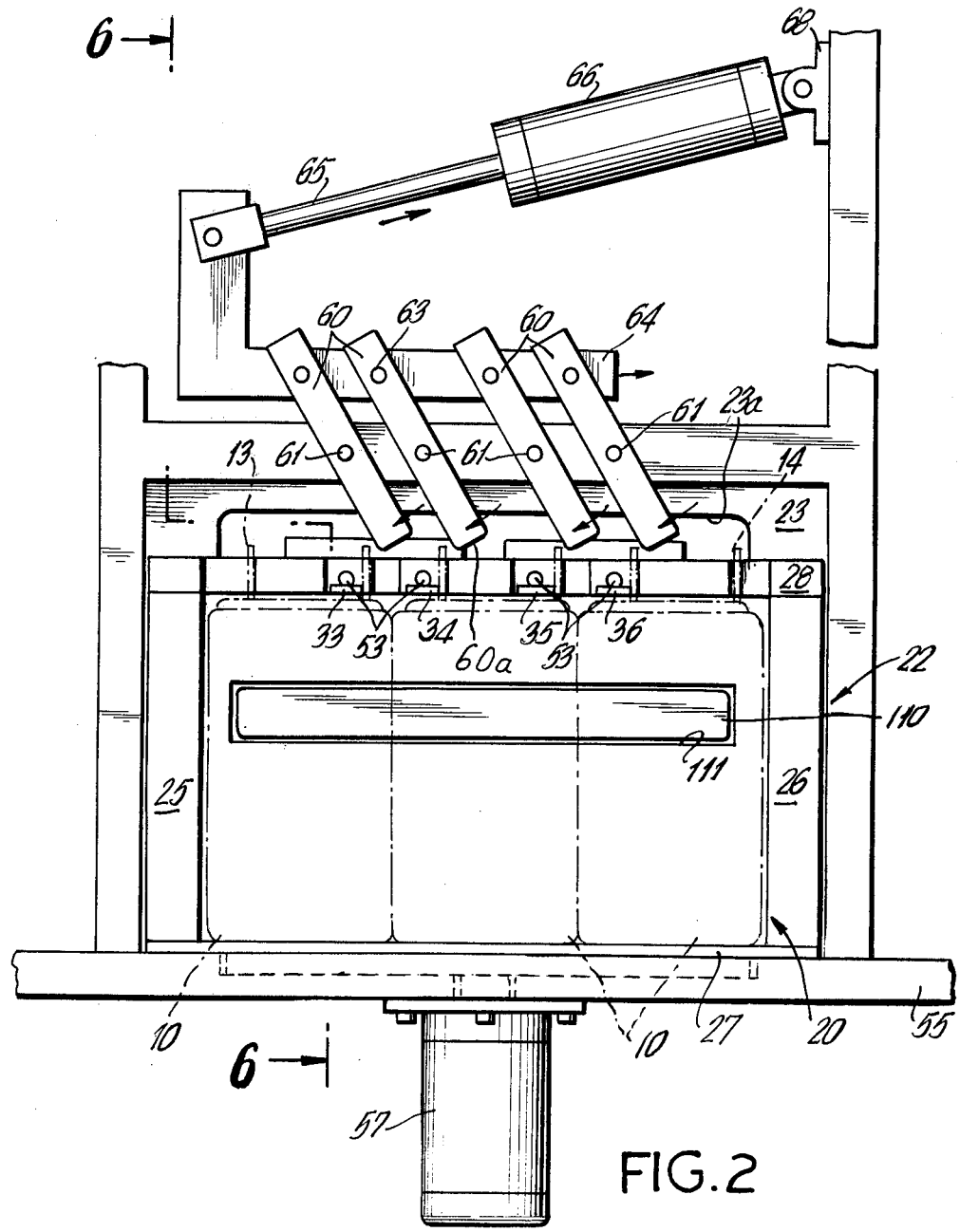
FIG. 2 is a front elevational view of a cell-holding fixture in accordance with the invention, together with the components of the bending means, prior to bending of the terminals.
Figure 3:
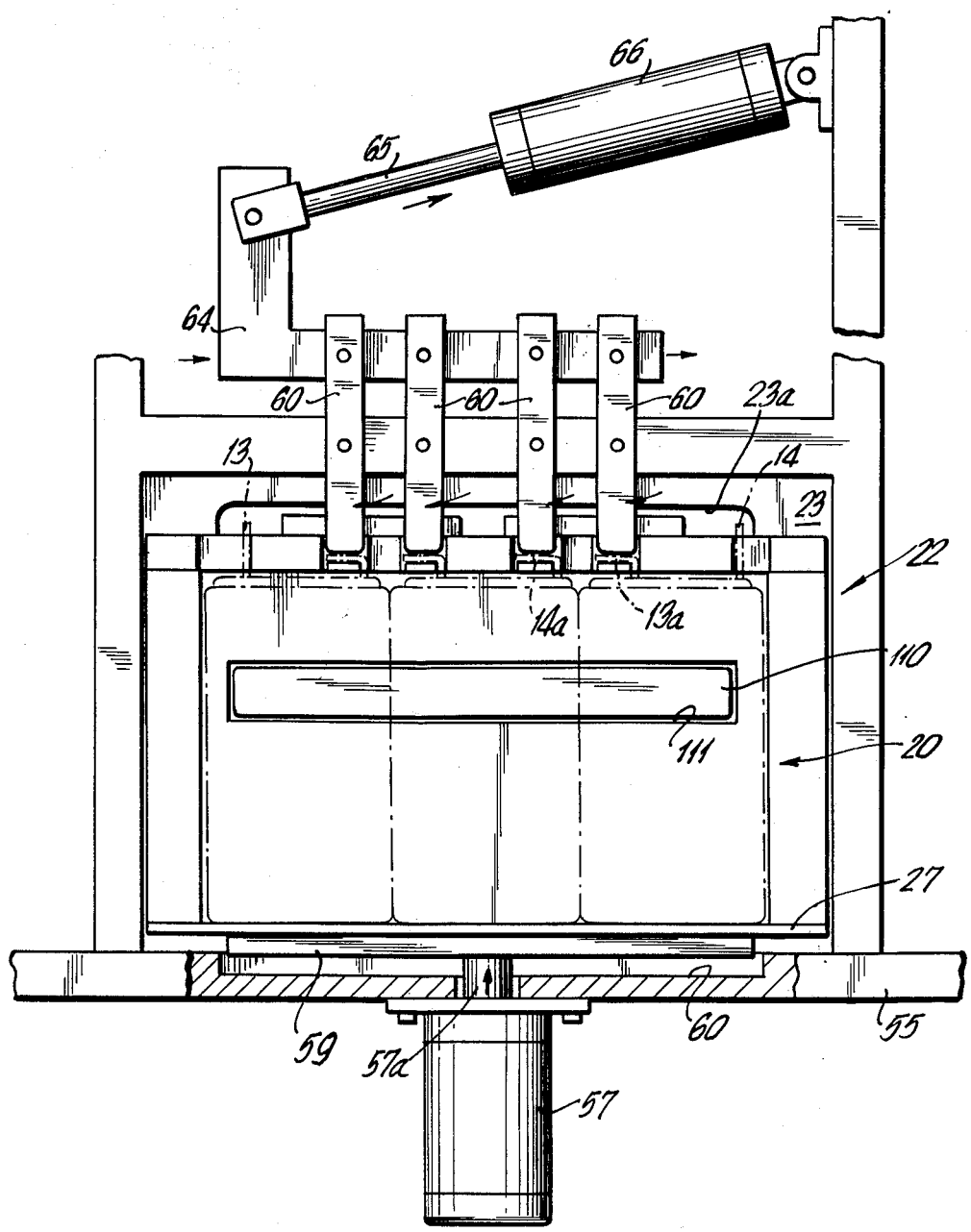
FIG. 3 is a front elevational view of the apparatus and components of FIG. 2, with the components shown in their positions following bending of the terminals.

FIGS. 2-3 illustrate the three cells loaded into a fixture 20 according to the invention, the fixture being slidably received within a frame 22 associated with the bending apparatus. A perspective view of the fixture 20 (situated between the rails associated with the welding apparatus) may be seen in FIG. 8.

Referring to FIGS. 2-6, the cell-holding fixture comprises a frame made up of two vertical side members 25, 26, a bottom support plate 27 and a top plate 28. The fixture also includes a back plate 30 (best exposed in FIGS. 5-6). In some of the figures, the three cells are shown in phantom lines in the positions they would assume in actual practice. The purpose of the fixture 20, as earlier mentioned, is to hold the cells in place for bending and welding and, in addition, to provide conductive electrodes 33-36 adjacent the cell terminals to be bent, these electrodes serving as the counter electrodes during the welding operation and also providing a reaction surface against which the terminals may be forced by the bending means.

Figure 4:
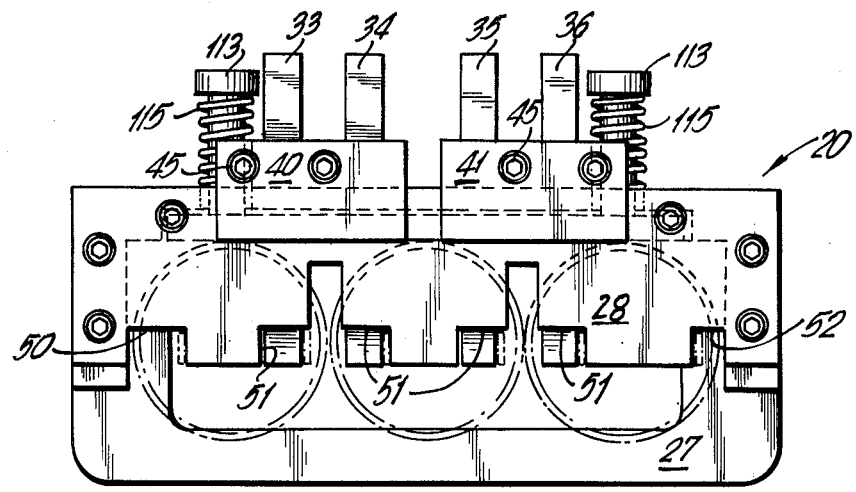
FIG. 4 is a top plan view of the cell-holding fixture.
Figure 5:
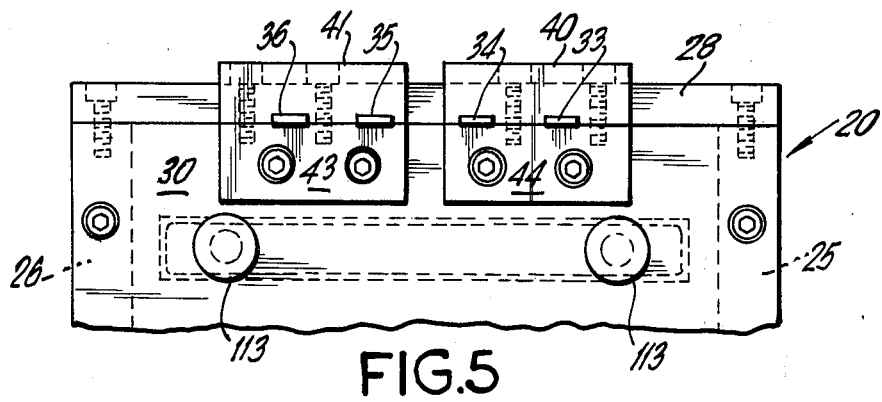
FIG. 5 is a partial back elevational view of the cell-holding fixture.

As best seen in FIGS. 4-5, the electrodes 33-36, fabricated from copper, copper alloy or other relatively durable but highly conductive material, are received in rectangular grooves provided in the top plate 28. These electrodes are firmly held in place by the conductive welding contact plates 40, 41, which also are grooved to locate the rearward end of the electrodes. Plates 40, 41 are fastened into electrode support members 43, 44, screwed into the face of the back plate 30. It will be noted that the side plates 25-26 of the fixture, together with the back 30 and top plate 28, all are fabricated from an insulating material, e.g., Textolite. The bottom plate 27, which is electrically isolated from the other elements of the fixture, is constructed of aluminum, whereas the plates 40, 41, 43, 44 are made of copper. The electrodes 33-36 may be adjusted longitudinally by loosening of the screws 45 in top plates 40, 41 and sliding the electrodes forwardly or backwardly, as may be required. Frequent adjustment may be required to these electrodes inasmuch as they are gradually consumed by the repetitive welding current to which they are subjected.

Figure 8:
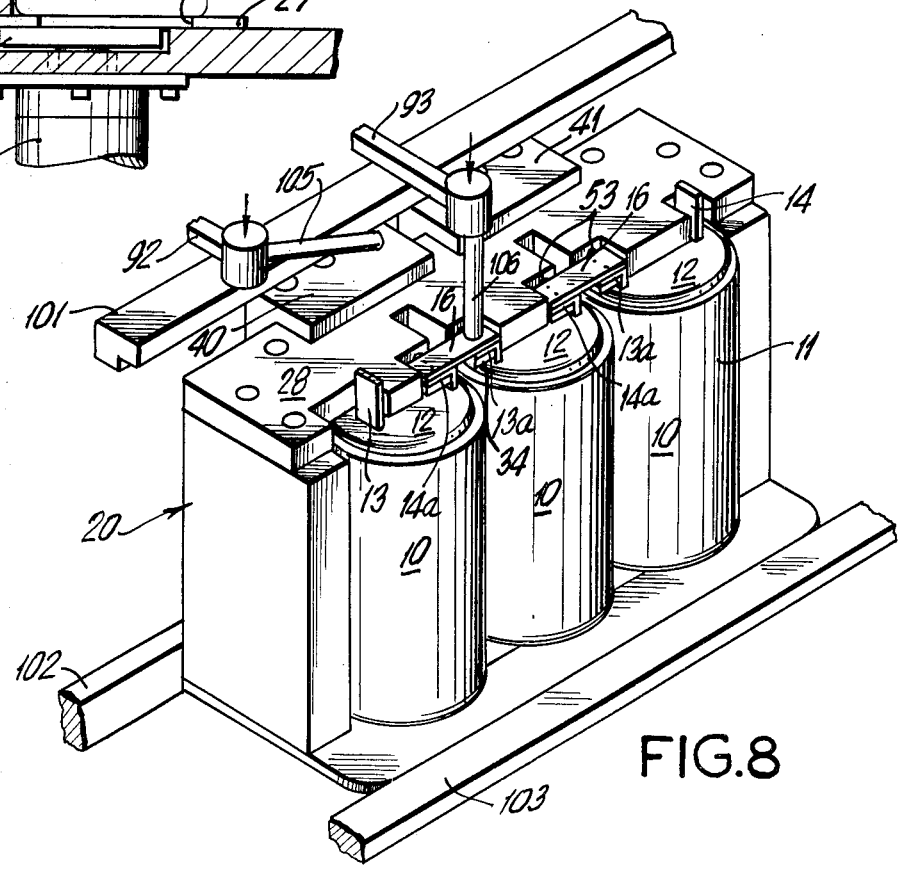
FIG. 8 is a perspective view of the cell-holding fixture at a welding station for welding interconnecting links to the folded cell terminals.

Referring to FIGS. 4 and 8, the top plate 28 is formed with a number of recesses 50, 51, 52 which are dimensioned to receive the width of the upstanding tab-like terminals 13, 14 for positioning and bending. These recesses are so spaced and dimensioned that the cell terminals, which have asymmetric locations at the top of the cell, can be fully received in the fixture 20 only when properly aligned, with the positive terminal of one cell next to the negative terminal of an adjacent cell. Embedded in the vertical surfaces at the rear of each recess 51 is a small cylindrical magnet 53 having one face terminating close to the surface of the recess 51. These magnets set up a magnetic field for magnetically retaining in place the link 16 during the welding operation.

Figure 6:
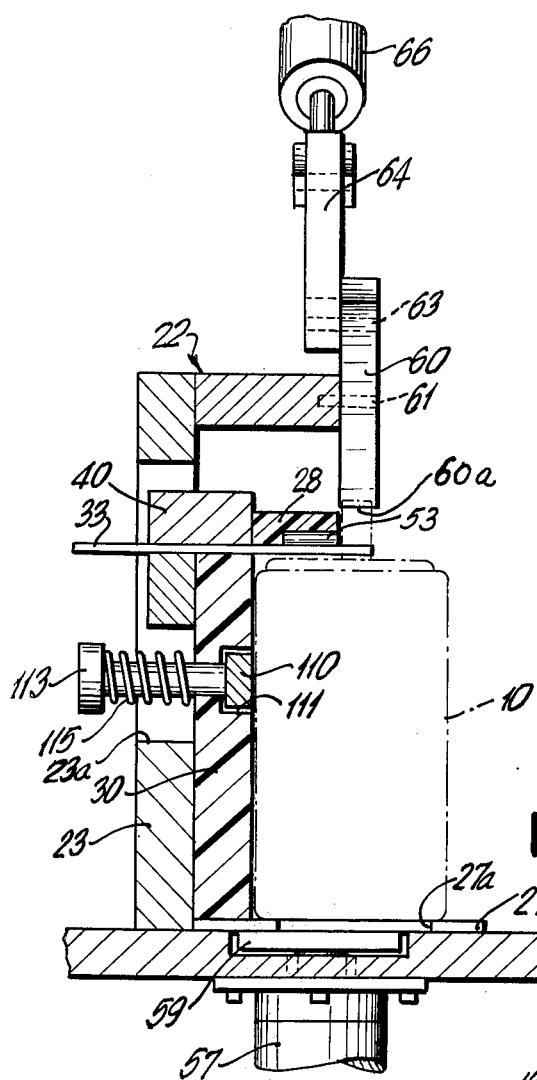
FIG. 6 is a side elevational view in cross section, taken generally along the line 6—6 in FIG. 2.

The cell-holding fixture 20 fits into the frame 22 of the bending means so that the entire fixture is slidably movable vertically from a lower position, in which the fixture rests on the surface of the table 55 (as illustrated in FIG. 2), to an upper position (FIG. 3) to which the fixture is raise by the action of an air cylinder 57 attached to the table 55. The movable piston 57a of the air cylinder terminates in a flat lifting member 59 normally located in a recess 60. The lifting member 59 is engageable with the bottom plate 27 of the fixture to lift it upwardly when the cylinder 57 is activated, and to again lower it when the air cylinder is deactivated. Referring to FIG. 6, the rear plate 23 of the frame 22 has a cut-out 23a which accommodates those elements of the fixture which protrude beyond the face of the back plate 30. This cut-out is dimensioned to preclude any interference during the lifting and lowering of the fixture.

Bending of the terminals 13, 14 is achieved by the action of pivotal bending arms 60, one arm associated with each terminal to be bent. Each arm is pivoted about a pin 61 attached to the top horizontal member of the frame 22. The upper ends of the bending arms 60 are pivotally attached via pins 63 to an L-shaped actuating member 64. The vertical leg of the actuating member 64 is, in turn, affixed to the movable piston 65 of an air cylinder 66 attached at its other end to a mounting bracket 68.

Bending of the terminals is accomplished as follows: The cells are loaded into the fixture with the orientation illustrated by the phantom lines in the drawings. The fixture is then placed into the frame 22 of the bending apparatus, whereupon the air cylinder 66 is actuated to move the actuating member 64 to the right (FIG. 2) and thereby cause the bending arms to move pivotally clock-wise. In so moving, the lower extremities of the bending arms 60 engage the upper portions of the terminals 13, 14, partially bending them over (toward the left) about the conductive electrodes 33-36. The next step in the bending operation is to energize the air cylinder 57. Referring to FIG. 3, this causes the entire fixture 20 to move upwardly, thereby pushing the partially bent terminals against the bottom surfaces 60a of the arms. Thereafter, the air cylinder 57 is deactivated to lower the fixture to its rest position on the surface of the table. As observed in FIG. 3, the bending arms 60 are received in the respective fixture recesses 51 when the arms have been moved to the vertical position and the fixture raised. Upon lowering of the fixture, the air cylinder 66 is activated to extend the piston 55 and move the actuator member 64 to the left, thereby returning the bending arms 60 to the position shown in FIG. 2.

Figures 7A, 7B, 7C:
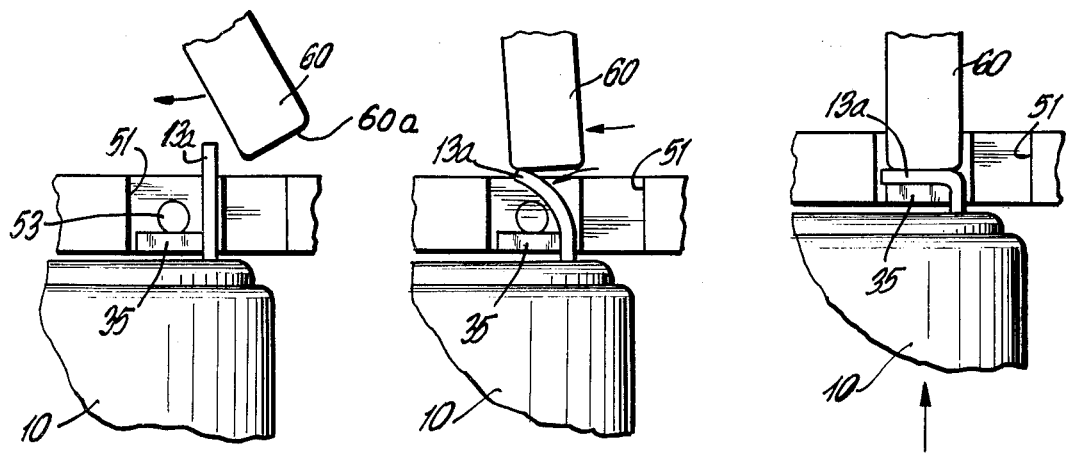
FIGS. 7A-7C are close-up fragmentary elevational views of the tip of one terminal bending arm and the top portion of a cell, illustrating the stages taking place during bending of a cell terminal.

Bending is carried out in the manner just described in order to avoid the problems inherent in other bending methods. A common problem, for example, is that the relatively malleable upstanding terminals of the cell become bent in the course of transporting the cells from one location to another and handling by the factory operatives. The fact that these terminals may be cocked in a direction opposite to the desired direction of bending precludes the use of a simple reciprocating mechanism, such as one which presses down on the terminal to be bent from the top, as this would bend any wrongly-cocked terminal in the incorrect direction. The bending device of FIGS. 2 and 3 eliminates such incorrect bending. As shown in FIGS. 7A-7C, the pivotal motion of the arm ensures that an outwardly bent terminal (FIG. 7A) will be engaged and partially bent in the correct direction (FIG. 7B) for final bending (FIG. 7C) by the relative vertical movement between the bending arm and the text fixture. It will be observed in FIG. 7C that the bottom surface 60a of the bending arms serves as an anvil against which the terminal is forced by this upward movement.

When the cell terminals have been bent over the electrodes 33-36, the cell-holding fixture is sent to a tape-applying station where the adhesive strip 17 is applied to the bottoms of the cells. To that end, the bottom support 27 of the fixture includes an opening 27a for receiving the strip.

Figure 9:
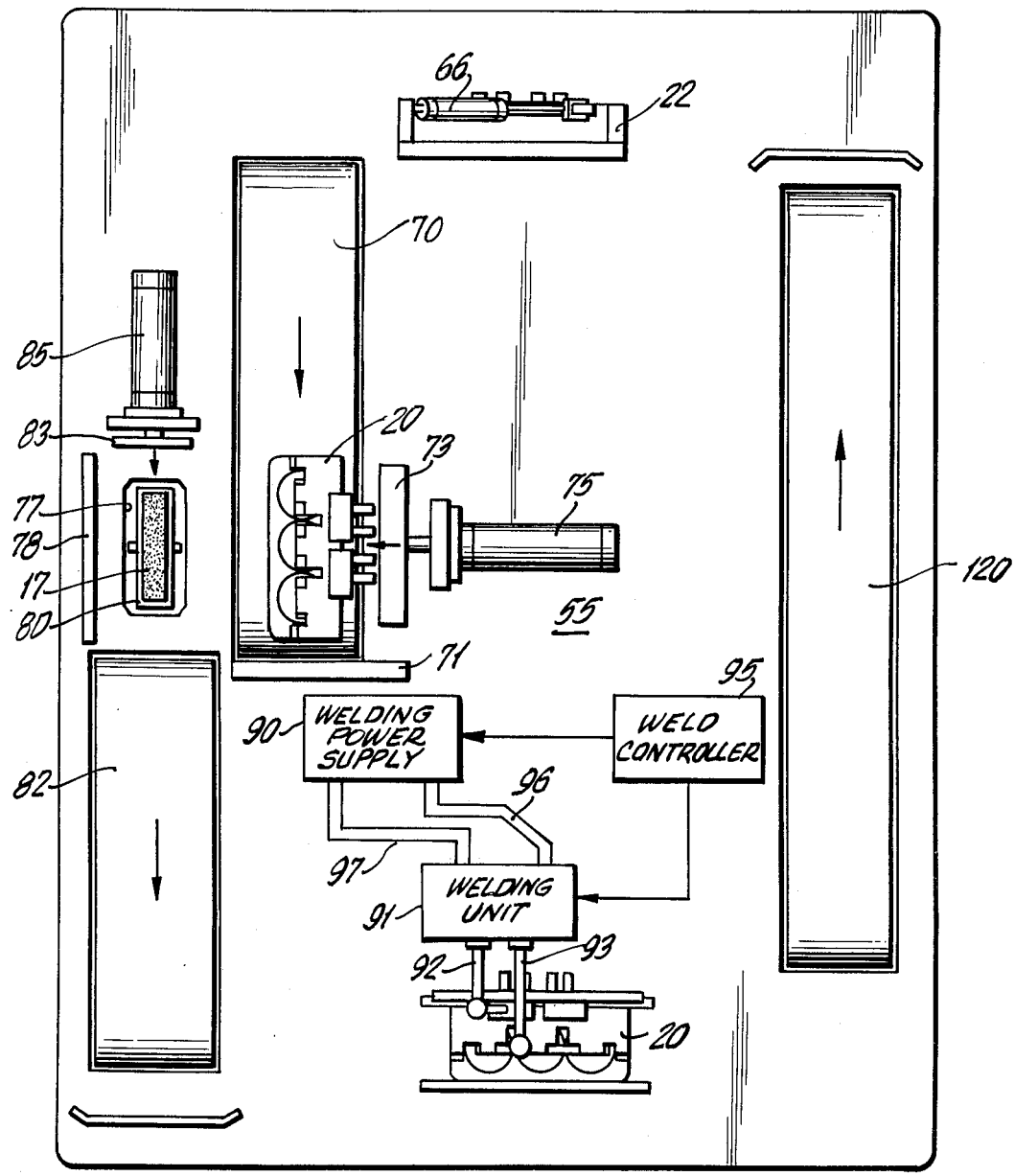
FIG. 9 is a plan view of an assembly table on which is located the bending means, adhesive strip applying means and a welding unit for carrying out the various assembly steps according to the invention.

Referring to FIG. 9, the assembly table and its associated elements are illustrated. For purpose of explanation, all the elements are assumed to be disposed on a single table 55; however, the elements could also be located on separate supporting structures. The terminal bending station is illustrated at the top of FIG. 9 and, as previously explained, includes the frame 22 and other elements of the bending means.

When the step of bending the terminals has been completed, the fixture 20 is removed from the bending means by the operative and placed on a conveyor 70 moving in the direction of the arrow to carry the fixture 20 to a location at the end of the conveyor against a stop 71. At this point, a pusher 73 operated by an air cylinder 75 pushes the fixture 20 leftward to a position over an elongated aperture 77 in the table 55. A stop 78 locates the cell-holding fixture in a predetermined position and orientation for the application of an adhesive strip 17. This strip is moved into contact with the cells through the opening 27a in the bottom of the fixture by the action of a mechanized platten 80 that forms one of the elements of a taping machine, such as the Tapeler Model 1501A. After application of the adhesive strip 17, the fixture is automatically pushed onto another conveyor 82 by a pusher 83 operated by an air cylinder 85. The conveyor 82, moving in the direction shown by the arrow, carries the fixture to the opposite end of the table where an operative performs the welding step.

Still referring to FIG. 9, the welding apparatus comprises a welding power supply 90, a welding unit 91, including welding arms 92, 93, and a weld controller unit 95 for controlling the welding current and the operation of the welding unit. Copper bus bars 96, 97 carry the welding current to the welding unit. In commercial practice, the following welding equipment has been found to yield good results: welding unit—Unitek Model No. 2-038; power supply—Unitek Model No. 10-192-01; welding controller—Unitek Model No. 1-150-01.

Preparatory to welding, the operative places links 16 over the bent-over terminals 13a, 14a in the fixture, the magnetic elements 53 holding the link in place for welding. The link is dimensioned to be accurately located relative to the terminals by the recesses 51 in the top plate 28 of the fixture. The operative next slides the entire text fixture 20 into a guided track (FIG. 8) formed by the guide rails 101, 102, 103. The track may also include a suitable stop (not shown) for positioning the cell-holding fixture for proper lateral alignment with the welding electrodes 105, 106. These electrodes are carried by the welding arms 92, 92, which are vertically movable in order to bring the electrode 105 into contact with one of the welding plates 40, 41, and the electrode 106 into contact with one of the links 16 directly over the terminal to be welded. In this manner, an electrical dircuit for the passage of welding current through the terminal connection is established by the welding electrode 106, link 16, terminal 14a (or 13a), one of the conductive electrodes (electrode 34 being shown for illustrative purposes), weld plate 40 and weld electrode 105. Following the application of welding current, the arms 92, 93 are lifted to their normal positions to disengage the weld electrodes from the fixture preparatory to the next weld. This welding operation is carried out for each weld connection to be made.

At the completion of the last weld, the three cells, now welded and taped together, are ejected from the fixture. To that end, the fixture includes an ejector bar 110 (FIG. 6). This bar is accommodated in a conforming recess 111 in the back plate 30 of the fixture. Attached to the ejector bar 110 and extending from the back of the plate 30 are two ejector rods 113 terminating in rounded caps. The ejector bar 110 and push rods 113 are resiliently biased in the retracted position by the coil springs 115. To eject the three-cell assembly from the fixture, an actuator (not shown) associated with the welding apparatus pushes the rods 113 forwardly so as to move the ejector bar 110 against the surfaces of the cells and thereby to extract the cells. This completes the cell assembling operation, and the fixture 20 from which cells have been ejected is placed onto a return conveyor 120 (FIG. 9) for reuse by the operative at the terminal bending station.

The apparatus and method described above are capable of assembling two or more cells in an efficient and effective manner. The complete operation needs only two operatives, whose requirements are greatly simplified over those previously demanded. Assembly time is greatly diminished while, importantly, the quality of assembly is enhanced owing to the mechanically controlled bending, taping and welding steps made possible by the invention.

Though the invention has been described with reference to a preferred embodiment and to suitable apparatus which can be used in practicing the invention, several modifications and variations may be incorporated without departing from the invention. For example, the order of the tape-applying and welding steps may be reversed, the welding electrodes may take various forms, and the fixture itself may be altered so as to place the conductive contact plate for the counter electrode at locations other than those shown in the drawings. All these and similar variations and modifications are intended to be included within the scope and spirit of the appended claims.

What we claim is:

1. A method for electrically interconnecting the terminals of plural electrochemical cells of a battery, the terminals projecting from a surface of each said cell, comprising:
   providing a cell-holding fixture for receiving said plural cells in fixed relation relative to each other, said fixture having a conductive electrode disposed to be adjacent each terminal to be connected;
   bending said terminals about said conductive electrodes so that the surfaces of said terminals lie generally in a common plane;
   placing a conductive link over the exposed surfaces of said bent terminals so as to be in physical and electrical contact therewith; and
   contacting said link and said fixture with respective welding electrodes to establish a circuit for the passage of welding current through the joint between the link and terminal in contact therewith and thereby to effect a weld connection at such joint.

2. The method of claim 1, further comprising:
   applying an adhesive strip to the corresponding surface of each cell to be connected while said cells are in said fixture, thereby to maintain said cells in fixed relationship to one another upon removal from the fixture.

3. The method of claim 2, wherein the terminals for said cells extend from a top surface thereof and wherein said strip is applied to a bottom surface thereof.

4. The method of claim 1, wherein the step of bending includes partially bending over said terminals and subsequently moving the said fixture in a direction to move the partially bent terminals toward a fixed reaction surface, thereby to complete the bending of the terminals about the conductive electrode.

5. Apparatus for electrically interconnecting the terminals of plural electrochemical cells for a battery, wherein the terminals extend from one surface of each cell, comprising:
   a fixture for receiving and holding said cells in mutually fixed relationship, with said extending terminals exposed,
   plural conductive electrodes carried by said fixture and respectively located adjacent the cell terminals to be interconnected, each said conductive electrode being adapted to carry welding current passing through the terminal which is adjacent thereto, and
   means for bending each of the terminals so that they lie generally in a common plane and in close proximity to said conductive electrode, said bent terminals being adapted to electrically contact said conductive electrode during passage of welding current through the terminal.

6. Apparatus according to claim 5, wherein said bending means includes:
   a bending arm pivotally movable between a first position out of contact with the terminal to be bent and a second position the arm engaging the terminal and bending it over the conductive electrode during its pivotal motion between said first and second positions.

7. Apparatus according to claim 6, wherein:
   said arm is operative to bend the terminal partially toward said common plane, the arm including an anvil surface for engaging the terminal when the arm is in the second position, the bending means including
   means for moving said fixture and said bending means relative to one another so as to cause said partially bent terminal to engage the anvil surface of said pivotal arm and be bent thereby into said common plane by the relative movement.

8. Apparatus according to claim 7, wherein:
   said moving means effects the movement of said cell-holding fixture toward the anvil surface of said arm.

9. Apparatus according to claim 5, further comprising:
   a member on said fixture and defining a link-receiving space spanning the distance between two terminals to be interconnected, whereby a connecting link may be placed therein in contact with said two terminals for welding thereto.

10. Apparatus according to claim 9, further comprising:
    a magnet located adjacent the link-receiving space so as to releasably retain the link in said space during the affixation thereof to said terminals.

11. Apparatus according to claim 5, wherein the terminals of the cells are interconnected by a conductive link in electrical contact therewith, the apparatus further comprising:

Welding means having a pair of welding electrodes, one of said electrodes adapted to contact the conductive link, the other electrode adapted to contact a component of said fixture in electrical continuity with said conductive electrode, thereby to establish a circuit between the welding electrode pair for the passage of welding current through said link and at least one terminal.

12. Apparatus according to claim 5, further comprising:

means for applying an adhesive strip to the corresponding surface of each of the cells to be interconnected while said cells are in said fixture, thereby to maintain said corresponding surfaces in fixed relationship to one another upon removal of the cells from the fixture.

13. Apparatus according to claim 12, wherein the terminals for said cells extend from a top surface thereof and wherein said adhesive strip is applied to a bottom surface thereof.

14. Apparatus according to claim 12, wherein said fixture includes a supporting member, said supporting member providing an aperture therethrough for exposing said corresponding surfaces of said cells, the adhesive strip applying means being operative to apply said strip via the aperture in said supporting member.

* * * * *